Jan. 20, 1931.   H. A. HUSTED   1,789,817
STEERING WHEEL
Original Filed Jan. 7, 1929   3 Sheets-Sheet 1
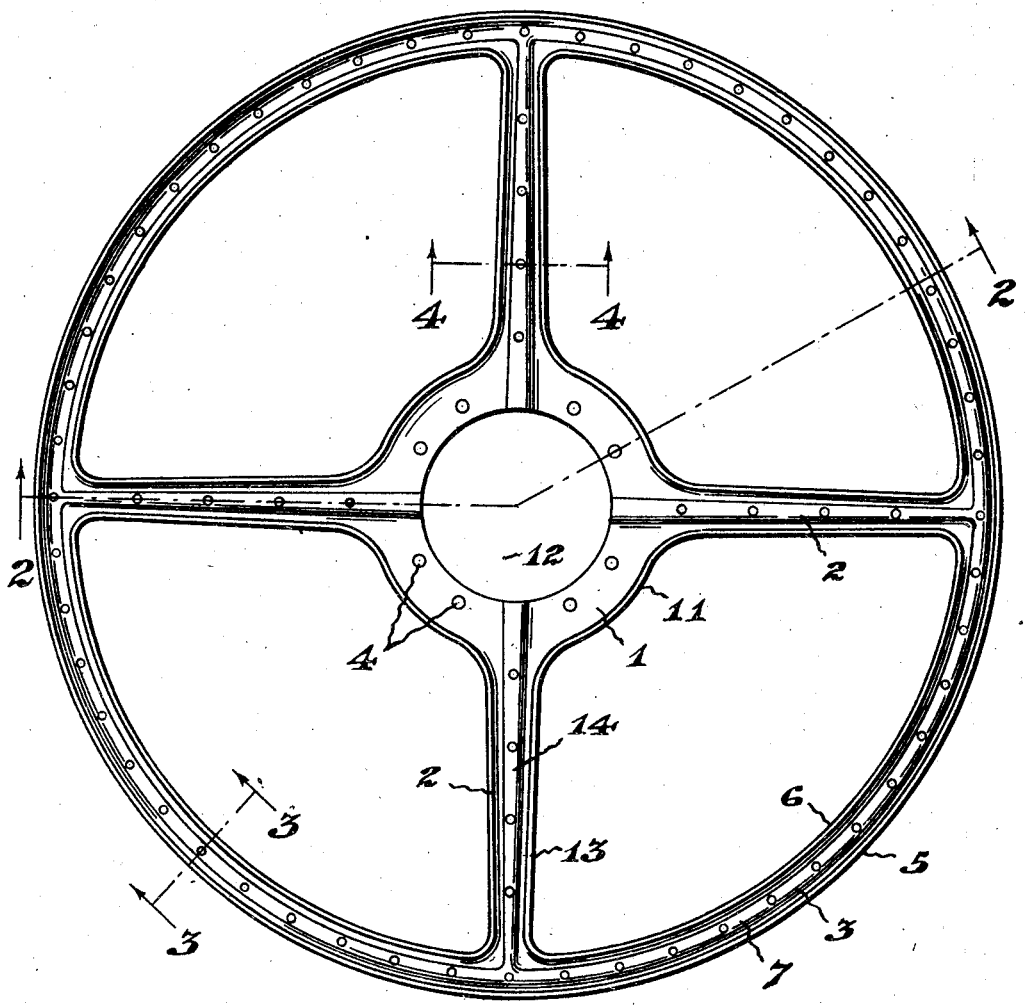
Fig. 1.
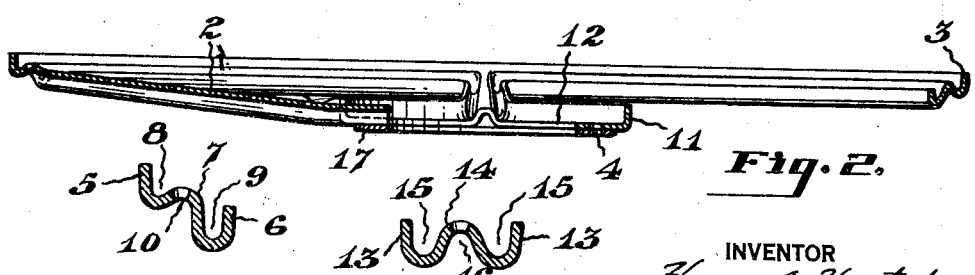
INVENTOR
Harry A. Husted
BY
Evans & McCoy
ATTORNEYS

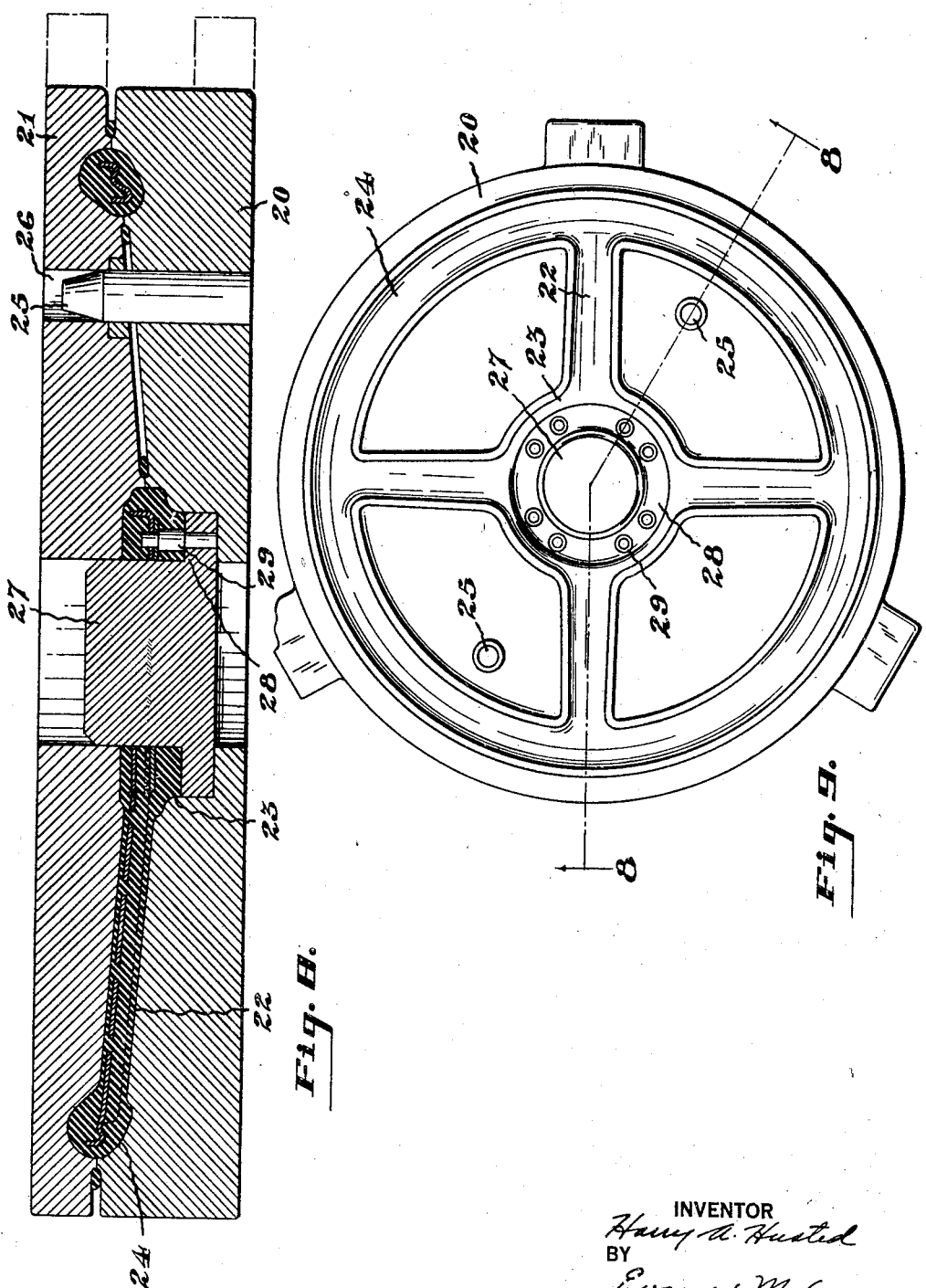

Patented Jan. 20, 1931

1,789,817

UNITED STATES PATENT OFFICE

HARRY A. HUSTED, OF CLEVELAND, OHIO, ASSIGNOR TO THE H. A. HUSTED COMPANY, OF DETROIT, MICHIGAN, A CORPORATION OF MICHIGAN

STEERING WHEEL

Original application filed January 7, 1929, Serial No. 330,781. Divided and this application filed January 30, 1930. Serial No. 424,484.

This invention relates to steering wheels, particularly to steering wheels of the reinforced composition material type, and is a division of my copending application Serial No. 330,781 filed January 7, 1929.

One of the objects of the present invention is to provide a reinforced composition steering wheel which is extremely rigid in construction and neat in appearance.

Another object is to provide a composition steering wheel with a reinforcing spider which is provided with means disposed at its hub portion for preventing distortion of the spider during the molding process.

A further object is to provide a composition steering wheel having a reinforcing spider provided with corrugations in the spokes extending radially from the hub portion thereof, with means bridging the corrugations in the hub portion to prevent distortion of the same during the operation of molding the rubber therearound.

These being among the objects of the present invention, the same consists of certain features of construction and combinations of parts to be hereinafter described with reference to the accompanying drawings, and then claimed, having the above and other objects in view.

In the accompanying drawings which illustrate a suitable embodiment of the present invention:

Figure 1 is a plan view of the metal reinforcing spider;

Fig. 2 is a section of the spider taken on the line 2—2 of Fig. 1;

Fig. 3 is an enlarged section through the spider rim taken on the line 3—3 of Fig. 1;

Fig. 4 is an enlarged section through one of the spider spokes taken in the line 4—4 of Fig. 1;

Fig. 8 is a section through the forming molds showing the composition material compressed around the reinforcing spider; and Fig. 9 is a plan view of the lower section of the forming mold.

Figure 5:
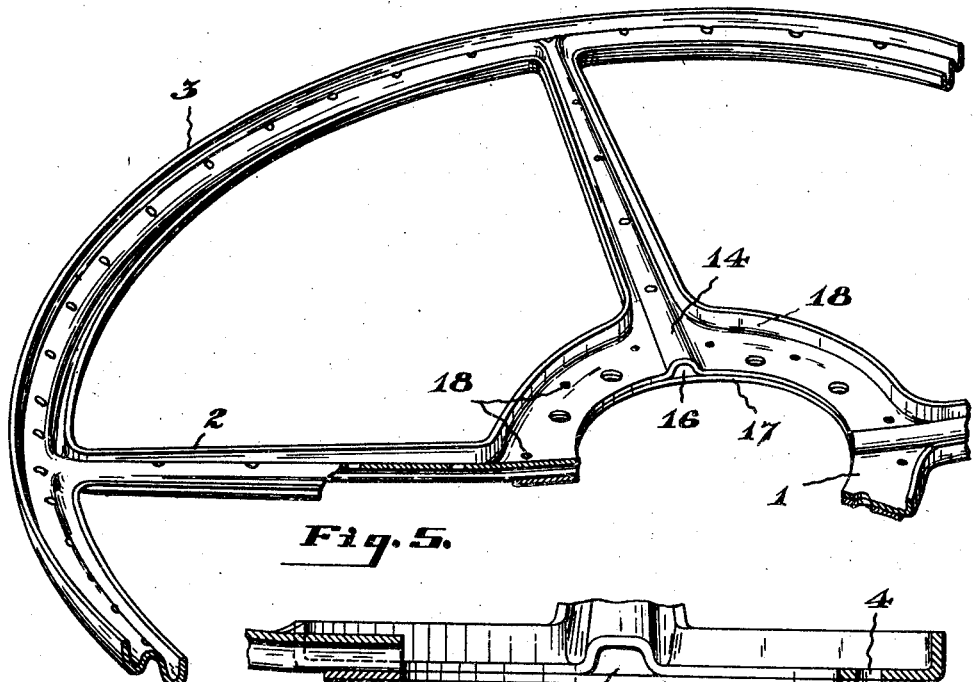
Fig. 5 is an enlarged fragmentary perspective view of the reinforcing spider showing the hub plate.

In my copending application filed February 11, 1927 and serially numbered 167,387, a steering wheel is described and claimed which comprises a single piece reinforcing spider around which a composition material is molded and bonded to all surfaces thereof. The reinforcing spider is preferably formed from a single metal plate to provide integral rim, spoke and hub portions, which are suitably flanged, channeled and beaded to provide substantially uniform strength throughout every portion of the wheel, so that in the event of a serious wreck, the driver of the vehicle will not be seriously injured by the breakage of the steering wheel.

In this spider, the spokes are provided with longitudinal depressions which extend through the hub to the central opening therein. It has been found that when the composition material is molded around the spider, the spider hub is distorted by the pressure exerted in bringing the mold sections together to compress the composition material. This distortion of the hub is produced by the tendency of the metal forming the depressions in the hub to flatten out and assume a plane surface under the influence of the molding pressure. Distortion of the reinforcing spider during the molding process is very objectionable and produces inferior wheels which are unsuitable for general use, as will be apparent to those skilled in the art.

My copending application Serial No. 167,387 contains claims generic to the spider structure shown herein and to be hereinafter described.

The present invention aims to provide a composition steering wheel whereby the reinforcing spider is prevented from being distorted during the molding of the composition material around the same.

Referring to the accompanying drawings in which like numerals refer to like parts throughout the several views, the reinforcing spider shown in Figs. 1 and 2 is preferably stamped from a single metal plate, and is provided with a central hub portion 1, spokes 2 radiating therefrom, and a continuous rim portion 3 integrally united with the spokes 2. The hub 1 is formed with a series of concentrically arranged openings 4 which receive the bolts that secure a separately formed wheel hub to the steering wheel when a separately formed hub unit is employed. The rim 3 of the spider has a continuous upwardly extending outer flange 5, inner upwardly extending flanges 6 along the inner edges thereof, and a continuous upwardly extending bead 7 formed in the web thereof intermediate the flanges 5 and 6. As shown in Fig. 3, the outer flange 5 is stepped in relation to the inner flanges 6, and this cross sectional shape provides the rim 3 with spaced upwardly presenting channels 8 and 9 and a downwardly presenting depression 10. The hub 1 of the spider as shown in Figs. 1 and 2, is formed with upwardly projecting flanges 11 around the outer edges thereof and with a large central opening 12.

The spokes 2 of the spider, like the rim 3, are preferably formed with upwardly projecting side flanges 13 and an upwardly extending longitudinal bead 14 intermediate the flanges 13, the side flanges 13 thereof being continuous with the hub flanges 11 and rim inner flanges 6, and the longitudinal beads 14 being continuous with the bead 7 of the rim 3. The cross section of the spokes 2, as shown in Fig. 4, may be described as being W-shaped, and having spaced upwardly presenting channels 15 branching into the rim channel 9 and a lower downwardly presenting depression 16 continuous with the rim depression 10. The beads 14 of the spokes 2 caused by the formation of the depressions 16 therein, extend through the hub portion and terminate at the central hub opening 12. The spider is in this way uniformly strengthened by the continuous flanges and beads.

Figure 6:
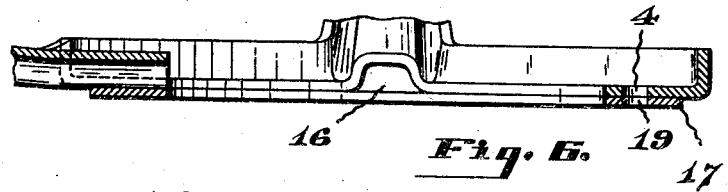
Fig. 6 is an enlarged fragmentary sectional view of the hub portion of the reinforcing spider.
Figure 7:
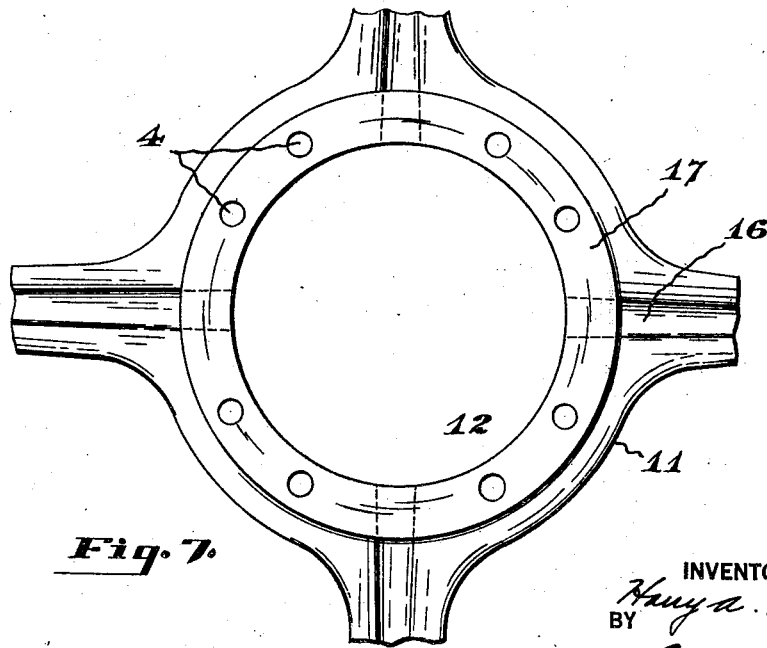
Fig. 7 is an enlarged fragmentary plan view of the lower side of the spider hub showing the hub plate positioned thereon.

An annular plate 17 is seated against the lower face of the hub portion 1 of the spider substantially as shown in Figs. 5, 6 and 7, so that it bridges the spoke depressions 16 which extend through the hub to the central opening 12 thereof. This plate 17 then is preferably spot welded to the hub 1 at points adjacent the sides of the spoke beads 14 substantially as indicated by the weld marks 18 in Fig. 5. It is to be understood, however, that the plate 17 may be secured to the hub 1 by rivets or any other suitable means. The plate 17 is formed with a series of openings 19 which are axially in line with the openings 4 in the hub through which the hub securing screws may extend. These openings 19 are preferably formed after the plate 17 is welded or otherwise secured in place. The plate 17 has a secondary purpose of providing a greater thickness of metal for the hub securing screws. The primary purpose of the plate 17, however, is to provide means for bridging the depressions 16 in the hub 1 to prevent distortion of the hub during the operation of forming the composition material around the spider. The function of this plate will be more fully described later in the specification.

The steering wheel is formed, as previously mentioned, by compressing and bonding a composition material around the reinforcing spider. The characteristics of the composition material are preferably such that the material will flow or be rendered workable when subjected to heat and pressure. The forming of the composition material around the spider is accomplished by the use of a heated mold which is adapted to compress the material around and bond or vulcanize the same to the spider. One embodiment of this mold is shown in Figs. 8 and 9 and comprises lower and upper mold sections 20 and 21 respectively. Each mold section is formed with continuous hub, spoke and rim depressions 23, 22 and 24, respectively, which, when the sections are brought together in closed relationship form cavities conforming in shape to the shape of the finished wheel. The lower mold section is provided with large diametrically opposite, upwardly extending dowel pins 25 adapted to register with openings 26 in the upper mold section 21 and prevent displacement of one section relative to the other. The lower mold section 20 is also provided with a central registering plug 27 which forms the wall of the hub cavity, and in addition centers the spider when it is positioned within the mold cavity. The registering plug 27 has an annular flange 28 which is provided with a plurality of circularly arranged pins 29 which extend upwardly into the hub cavity of this mold and project through the hub openings 4 and 19 of the spider and ring 17 to prevent the composition material from closing in the openings 4 and to prevent rotational movement of the spider relative to the mold sections so that the same is positioned correctly within the mold cavity.

Composition material elements are first positioned within the hub, spoke and rim depressions 23, 22 and 24 respectively of the lower mold section 20, and the reinforcing spider is then positioned on these elements with the pins 29 extending through the hub and reinforcing plate openings 4 and 19. Component composition material elements are next seated upon the hub, spokes and rim of the spider, and the upper mold section 21 is finally assembled to the lower section 20. The mold sections being held at a temperature suitable for vulcanizing or bonding the composition material to the spider, are moved toward each other preferably by hydraulic pressure to compress the composition material so that it completely fills the mold cavities and intimately contacts with the surfaces of the spider. The sections are left in closed position a sufficient length of time to permit the composition material to become vulcanized or bonded to the surfaces of the spider. A great portion of the gases produced during the molding of the composition material flow along the depressions 16 and channels 15 of the spider spokes 2 and are liberated adjacent to the registering plug 27 at the central hub opening 12.

Considerable pressure is exerted by the mold sections to compress the composition material and it is apparent that this pressure tends to flatten out the beads 14 which would distort the spider if the plate 17 were not employed. This would result in an inferior product. With applicant's structure this cannot happen because the plate 17 is rigidly attached to the hub of the spider on each side of and bridges the depressions 16. This plate 17 therefore provides a spider hub 1 in which pressures exerted against the beads 14 do not distort the same. It can be easily seen by one skilled in the art that this feature presents many advantages.

It will be apparent from the drawings and foregoing description that the present invention provides a composition steering wheel which satisfactorily eliminates objectionable distortion of the wheel spider during the molding operation. Further, that the means provided for restraining the spider against distortion adds very little to the weight and cost of making the wheel, and greatly strengthens the same.

Furthermore, it is to be understood that the sections of the reinforcing spider shown and described, and the particular procedure set forth, are presented for purposes of explanation and illustration and that various modifications of said spider and procedure can be made without departing from the spirit and substance of the broad invention, the scope of which is commensurate with the appended claims.

What I claim is:

1. In a composition steering wheel, a reinforcing spider therefor, a hub portion for said spider having radial depressions therein, a composition material molded around said spider, and an annular plate rigidly secured to said hub portion to bridge said depressions whereby said hub is restrained against distortion during the process of molding said composition material around said spider under pressure.

2. In a composition steering wheel, a one-piece reinforcing spider having integral rim, spoke and hub portions, said hub portions being formed with depressions radiating into said spoke portions, a composition material covering completely surrounding said rim, spoke and hub portions, and an annular plate rigidly secured to said hub at points adjacent to said depressions for restraining said hub portion against distortion during the forming of said composition material around said spider under pressure.

3. In a composition steering wheel, a hub annulus embedded in the hub of said wheel, spokes embedded in the spokes of said wheel and being integral with said hub annulus, said spokes having longitudinal depressions therein extending across said hub annulus to the central opening thereof, and an annular plate bridging said depressions and secured to said hub annulus at opposite sides of said depressions to restrain said hub annulus against distortion during the forming of the composition around said hub annulus.

In testimony whereof I affix my signature.

HARRY A. HUSTED.